US011838804B2

(12) United States Patent
Pugeat et al.

(10) Patent No.: US 11,838,804 B2
(45) Date of Patent: Dec. 5, 2023

(54) ENHANCED METHOD FOR PREPARING CONDITIONAL HANDOVER TO AVOID PREEMPTION

(71) Applicant: Nokia Technologies Oy, Espoo (FI)

(72) Inventors: Jean-Michel Pugeat, Paris (FR); Jürgen Mayer, Blaustein (DE); Michael Schopp, Ulm (DE); Ingo Viering, Munich (DE); Ahmad Awada, Munich (DE); Jedrzej Stanczak, Wroclaw (PL)

(73) Assignee: NOKIA TECHNOLOGIES OY, Espoo (FI)

( * ) Notice: Subject to any disclaimer, the term of this patent is extended or adjusted under 35 U.S.C. 154(b) by 265 days.

(21) Appl. No.: 17/280,254

(22) PCT Filed: Jul. 26, 2019

(86) PCT No.: PCT/FI2019/050560
§ 371 (c)(1),
(2) Date: Mar. 26, 2021

(87) PCT Pub. No.: WO2020/070373
PCT Pub. Date: Apr. 9, 2020

(65) Prior Publication Data
US 2022/0053384 A1 Feb. 17, 2022

Related U.S. Application Data

(60) Provisional application No. 62/742,001, filed on Oct. 5, 2018.

(51) Int. Cl.
*H04W 36/00* (2009.01)
*H04W 28/26* (2009.01)

(52) U.S. Cl.
CPC ....... *H04W 36/0016* (2013.01); *H04W 28/26* (2013.01); *H04W 36/0058* (2018.08); *H04W 36/00837* (2018.08)

(58) Field of Classification Search
CPC ... H04W 36/08; H04W 36/14; H04W 12/062; H04W 36/0085; H04W 36/0016;
(Continued)

(56) References Cited

U.S. PATENT DOCUMENTS 11,412,432 B2 * 8/2022 Yan .................. H04W 36/08
2005/0208972 A1 * 9/2005 Vainola ............. H04L 69/08
370/473

(Continued)

FOREIGN PATENT DOCUMENTS

CN 101155035 A * 4/2008
CN 103430593 A * 12/2013
(Continued)

OTHER PUBLICATIONS

Office action received for corresponding Indian Patent Application No. 202147019333, dated Feb. 10, 2022, 6 pages.
(Continued)

*Primary Examiner* — Dung Hong
(74) *Attorney, Agent, or Firm* — SQUIRE PATTON BOGGS (US) LLP

(57) ABSTRACT

In accordance with some embodiments, a method may include transmitting, by a source network entity, at least one handover prepare request comprising at least one extension indication to a target network entity. The method may further include receiving, by the source network entity, in response to the at least one handover prepare request, at least one handover request response from the target network entity. The method may further include transmitting, by the source network entity, at least one handover command acknowl-
(Continued)

edgement to at least one user equipment based upon the at least one handover request response.

10 Claims, 6 Drawing Sheets

(58) Field of Classification Search
CPC ............. H04W 36/18; H04W 36/0011; H04W 36/0022; H04W 36/0058; H04W 36/0055; H04W 36/00837; H04W 28/26
See application file for complete search history.

(56) References Cited

U.S. PATENT DOCUMENTS

| | | | |
|---|---|---|---|
| 2006/0128385 A1* | 6/2006 | Lee ....................... | H04W 36/14 455/436 |
| 2017/0135001 A1* | 5/2017 | Kim ...................... | H04L 5/0055 |
| 2020/0281038 A1* | 9/2020 | Fujishiro ............. | H04W 36/305 |

FOREIGN PATENT DOCUMENTS

| | | | |
|---|---|---|---|
| CN | 106454876 A | * | 2/2017 |
| EP | 2835925 A1 | * | 2/2015 |
| KR | 20160134392 A | * | 11/2016 |
| KR | 20160134392 A | * | 11/2016 |
| WO | WO-2007124677 A1 | * | 11/2007 |
| WO | 2018/132051 A1 | | 7/2018 |
| WO | 2018/172600 A1 | | 9/2018 |
| WO | 2018/175819 A1 | | 9/2018 |
| WO | WO-2018172600 A1 | * | 9/2018 |
| WO | 2019/138155 A1 | | 7/2019 |

OTHER PUBLICATIONS

Martikainen et al., "On the Basics of Conditional Handover for 5G Mobility", IEEE 29th Annual International Symposium on Personal, Indoor and Mobile Radio Communications (PIMRC), Sep. 9-12, 2018, 7 pages.

"3rd Generation Partnership Project; Technical Specification Group Radio Access Network; NG-RAN; Xn application protocol (XnAP) (Release 15)", 3GPP TS 38.423 V15.0.0, Jun. 2018, pp. 1-195.

"MulteFire Alliance Technical Specification Group Radio Access Network; Evolved Universal Terrestrial Radio Access (E-UTRA); Radio Resource Control (RRC); Protocol specification (Release 1.1)", MFA TS 36.331 V1.1.1, Feb. 2018, pp. 1-786.

"MulteFire Alliance Technical Specification Group Radio Access Network; Evolved Universal Terrestrial Radio Access Network (E-UTRAN); X2 application protocol (X2AP) (Release 1.1)", MFA TS 36.423 V1.1.1, Feb. 2018, pp. 1-250.

Zhang et al., "An Adaptive Resource Reservation Strategy For Handoff In Wireless CDMA Cellular Networks", Canadian Journal of Electrical and Computer Engineering, vol. 29, No. 1/2, Jan.-Apr. 2004, pp. 77-83.

"On the Condition Information Availability to CHO Candidate Targets", 3GPP TSG-RAN WG2 Meeting #107, R2-19xxxxx, Agenda: 11.9.3.1, Nokia, Aug. 26-30, 2019, 2 pages.

International Search Report and Written Opinion received for corresponding Patent Cooperation Treaty Application No. PCT/FI2019/050560, dated Oct. 14, 2019, 16 pages.

Park et al., "Handover Mechanism in NR for Ultra-Reliable Low-Latency Communications", IEEE Network, vol. 32, No. 2, Apr. 2018, pp. 41-47.

"Potential Improvements of Mobility Robustness in LTE", 3GPP TSG-RAN WG2 Meeting #103bis, R2-1814463, 9 Agenda: 12.3.3, Nokia, Oct. 8-12, 2018, 6 pages.

Extended European Search Report received for corresponding European Patent Application No. 19869995.1, dated Mar. 24, 2022, 14 pages.

"Discussion on control plan signalling design for LTE CHO", 3GPP TSG-RAN WG3 #104, R3-192662, Agenda: 15.3, Huawei, May 13-17, 2019, 4 pages.

* cited by examiner

ENHANCED METHOD FOR PREPARING CONDITIONAL HANDOVER TO AVOID PREEMPTION

RELATED APPLICATION

This application was originally filed as PCT Application No. PCT/FI2019/050560 on Jul. 26, 2019, which claims priority from U.S. Provisional Application No. 62/742,001, filed Oct. 5, 2018, each of which is incorporated herein by reference in its entirety.

CROSS REFERENCE TO RELATED APPLICATION

This application claims the benefit of U.S. Provisional Application No. 62/742,001, filed Oct. 5, 2018. The entire content of the above-referenced application is hereby incorporated by reference.

BACKGROUND

Field

Certain embodiments may relate to wireless communication systems. For example, some embodiments may relate to conditional handovers.

Description of the Related Art

Conditional handovers may serve as a mobility improvement in some wireless communications systems. Conditional handovers may resemble legacy handover techniques, where a configured event triggers user equipment to send a measurement report. A source network entity may use measurement reports to notify a target network entity of the handover, and then send a handover command to the user equipment.

With legacy handover, user equipment may immediately access a target cell to complete the handover process. In comparison, with conditional handovers, user equipment will only access the target entity once an additional conditional handover execution condition expires. The conditions for such handover are typically configured by the source network entity as part of the handover command. Conditional handovers allow for early transmission of handover commands while the user equipment is still associated with the source network entity, without risking the access with, and stability of, the target network entity.

Conditional handovers may be associated with uncertainty. With a legacy handover, a target network entity may reserve resources for the user equipment for a limited time since the user equipment will appear shortly after. Such resources may be random access channel (RACH) resources, as well as other resources to handle data and control bearers, such as control channels and physical resource blocks. In contrast, resources with conditional handovers may need to be reserved for a longer time period. In particular, it may require an uncertain amount of time until a condition triggers a final execution of the conditional handover, leaving resources reserved unnecessarily long. In addition, the earlier that a certain target network entity receives handover notification, the more likely that the target network entity is the wrong target network entity. As a result, the conditional handover may be cancelled, never executed, or executed with a different target, resulting in wasted network resources. Thus, it is desirable to increase radio resources used for data by reducing the resource reservation, and to improve the preparation part of conditional handovers.

SUMMARY

In accordance with some embodiments, a method may include transmitting, by a source network entity, at least one handover prepare request comprising at least one extension indication to a target network entity. The method may further include receiving, by the source network entity, in response to the at least one handover prepare request, at least one handover request response from the target network entity. The method may further include transmitting, by the source network entity, at least one handover command acknowledgement to at least one user equipment based upon the at least one handover request response.

In accordance with some embodiments, an apparatus may include means for transmitting at least one handover prepare request comprising at least one extension indication to a target network entity. The apparatus may further include means for receiving, in response to the at least one handover prepare request, at least one handover request response from the target network entity. The apparatus may further include means for transmitting at least one handover command acknowledgement to at least one user equipment based upon the at least one handover request response.

In accordance with some embodiments, an apparatus may include at least one processor and at least one memory including computer program code. The at least one memory and the computer program code can be configured to, with the at least one processor, cause the apparatus to at least transmit at least one handover prepare request comprising at least one extension indication to a target network entity. The at least one memory and the computer program code can be further configured to, with the at least one processor, cause the apparatus to at least receive, in response to the at least one handover prepare request, at least one handover request response from the target network entity. The at least one memory and the computer program code can be further configured to, with the at least one processor, cause the apparatus to at least transmit at least one handover command acknowledgement to at least one user equipment based upon the at least one handover request response.

In accordance with some embodiments, a non-transitory computer readable medium can be encoded with instructions that may, when executed in hardware, perform a method. The method may include transmitting at least one handover prepare request comprising at least one extension indication to a target network entity. The method may further include receiving, in response to the at least one handover prepare request, at least one handover request response from the target network entity. The method may further include transmitting at least one handover command acknowledgement to at least one user equipment based upon the at least one handover request response.

In accordance with some embodiments, an apparatus may include circuitry configured to transmit at least one handover prepare request comprising at least one extension indication to a target network entity. The circuitry may further be configured to receive, in response to the at least one handover prepare request, at least one handover request response from the target network entity. The circuitry may further be configured to transmit at least one handover command acknowledgement to at least one user equipment based upon the at least one handover request response.

In accordance with some embodiments, a computer program product may perform a method. The method may include transmitting at least one handover prepare request comprising at least one extension indication to a target network entity. The method may further include receiving, in response to the at least one handover prepare request, at least one handover request response from the target network entity. The method may further include transmitting at least one handover command acknowledgement to at least one user equipment based upon the at least one handover request response.

In accordance with some embodiments, a method may include receiving, by a target network entity, at least one handover prepare request comprising at least one extension indication from a source network entity. The method may further include transmitting, by the target network entity, at least one handover request response based upon the at least one handover prepare request to the source network entity. The method may further include generating, by the target network entity, at least one resource reservation.

In accordance with some embodiments, an apparatus may include means for receiving at least one handover prepare request comprising at least one extension indication from a source network entity. The apparatus may further include means for transmitting at least one handover request response based upon the at least one handover prepare request to the source network entity. The apparatus may further include means for generating at least one resource reservation.

In accordance with some embodiments, an apparatus may include at least one processor and at least one memory including computer program code. The at least one memory and the computer program code can be configured to, with the at least one processor, cause the apparatus to at least receive at least one handover prepare request comprising at least one extension indication from a source network entity. The at least one memory and the computer program code can be further configured to, with the at least one processor, cause the apparatus to at least transmit at least one handover request response based upon the at least one handover prepare request to the source network entity. The at least one memory and the computer program code can be further configured to, with the at least one processor, cause the apparatus to at least generate at least one resource reservation.

In accordance with some embodiments, a non-transitory computer readable medium can be encoded with instructions that may, when executed in hardware, perform a method. The method may include receiving at least one handover prepare request comprising at least one extension indication from a source network entity. The method may further include transmitting at least one handover request response based upon the at least one handover prepare request to the source network entity. The method may further include generating at least one resource reservation.

In accordance with some embodiments, an apparatus may include circuitry configured to receive at least one handover prepare request comprising at least one extension indication from a source network entity. The circuitry may further be configured to transmit at least one handover request response based upon the at least one handover prepare request to the source network entity. The circuitry may further be configured to generate at least one resource reservation.

In accordance with some embodiments, a computer program product may perform a method. The method may include receiving at least one handover prepare request comprising at least one extension indication from a source network entity. The method may further include transmitting at least one handover request response based upon the at least one handover prepare request to the source network entity. The method may further include generating at least one resource reservation.

BRIEF DESCRIPTION OF THE DRAWINGS

For proper understanding of this disclosure, reference should be made to the accompanying drawings, wherein.

DETAILED DESCRIPTION

Certain embodiments described herein may help to manage conditional handover. The example embodiments described herein may have various benefits and/or advantages. For example, some embodiments may increase resources used for data by improving the preparation phase of conditional handovers. Certain embodiments described herein may also activate and/or deactivate conditional handover features on a finer granularity, such as temporarily, per user equipment, per bearer, and/or without explicit network entity configuration update indications. Certain embodiments are, therefore, directed to improvements in computer-related technology, specifically, by conserving network resources and reducing power consumption of network entities and/or user equipment located within the network.

Discussed herein are improvements to conditional handovers. For example, when a conditional handover is rejected, a source network entity may no longer initiate additional conditional handovers to a target network entity for a particular user equipment, while still allowing legacy handovers. Alternatively, a source network entity may indicate that no additional conditional handovers for the user equipment may be initiated as long as the bearer configuration does not change, while still allowing legacy handovers. As another example, if the user equipment changes from a high bit rate to a low bit rate service, such as when changing from web browsing to voice over internet protocol (VoIP), mobility robustness may be more important, with a reduced disadvantage of pre-emption, resulting in a temporary deactivation of conditional handovers.

Further discussed herein, a conditional handover may be rejected, and the source network entity may no longer initiate further conditional handovers to the target network entity for any user equipment in the associated cell using a subsequent network entity configuration update. Furthermore, a conditional handover deactivation may be temporarily limited, such as based on the target network entity providing a timer value, allowing the source network entity to resume conditional handovers when the timer expires. In addition, the target cell may also stipulate conditional deactivation on the current conditional handover configuration in the source cell. For example, it may use a HO PREPARA- TION FAILURE message to implicitly request the source entity to loosen the conditional handover parameters, allowing the source network entity to initiate further handovers when conditional handover parameters are loosened.

Figure 1:
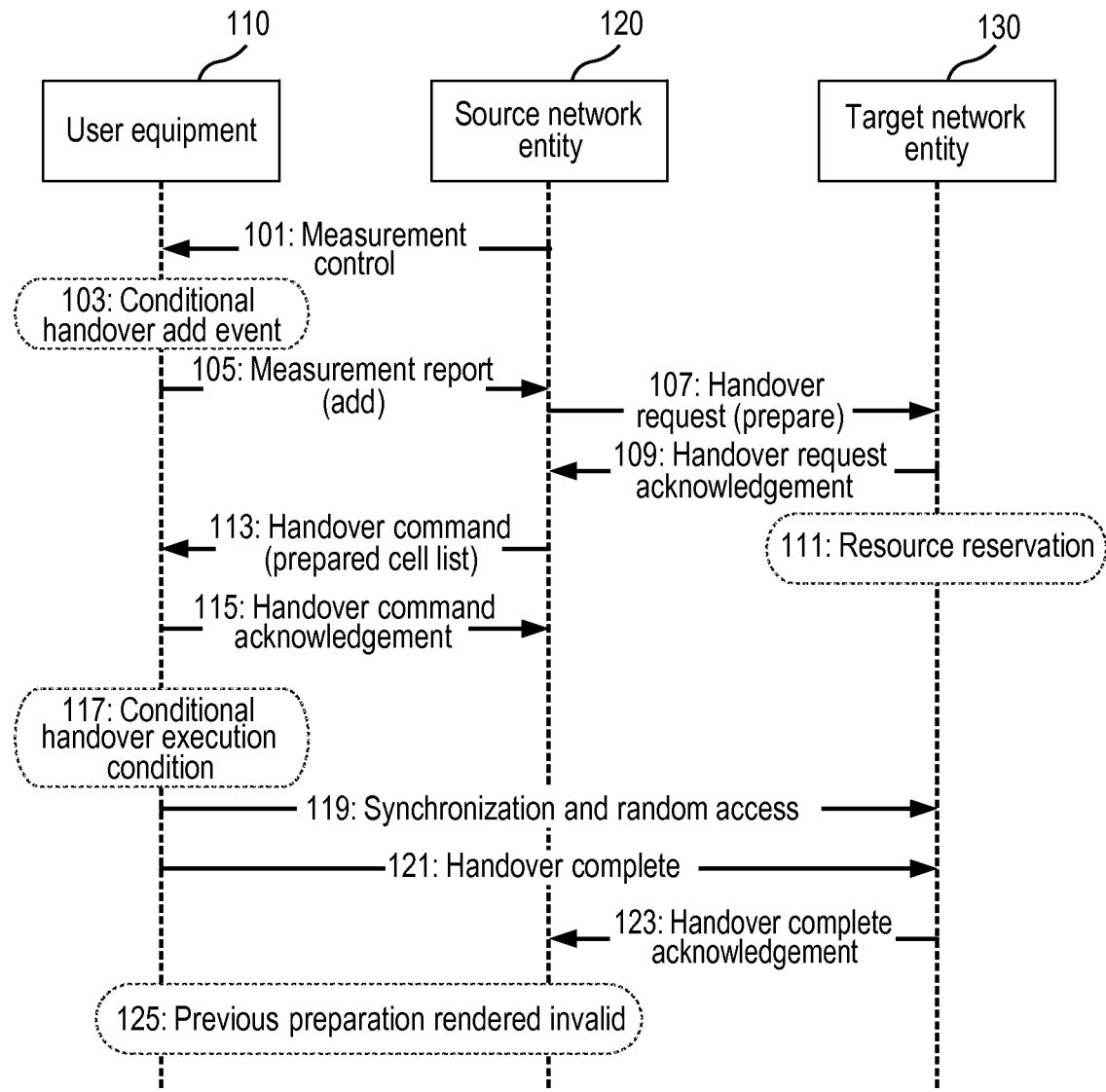
FIG. 1 illustrates a signaling diagram according to certain embodiments.

FIG. 1 illustrates an example of a signalling diagram according to some embodiments. In particular, FIG. 1 illustrates a conditional handover preparation and conditional handover execution. User equipment (UE) 110 may be similar to UE 610 in FIG. 6. In addition, source network entity (NE) 120 and/or target NE 130 may be similar to NE 620 and NE 630 in FIG. 6, respectively. Although only a single UE, source NE, and target NE are illustrated, a communications network may contain one or more of each of these entities.

In step 101, source NE 120 may transmit at least one measurement control indication to UE 110. In step 103, UE 110 may generate at least one conditional handover add event. In step 105, UE 110 may transmit at least one measurement add report to source NE 120.

In step 107, source NE 120 may transmit at least one handover prepare request to target NE 130. In some embodiments, the at least one handover prepare request may comprise at least one additional handover cause, such as radio condition and/or load balancing. In certain embodiments, the at least one handover prepare request may comprise at least one indication of conditional handover configuration, such as the indication of early triggering of conditional handover and/or for multiple targets. For example, the at least one indication of conditional handover configuration may include at least one indication that at least one resource reservation may be unnecessary and/or early, allowing target NE 130 to reserve fewer resources than necessary. In various embodiments, the at least one handover prepare request may comprise at least one indication of configuration of at least one execution condition which triggers the execution of the prepared conditional handover towards the target network entity.

In some embodiments, the at least one handover prepare request may comprise at least one value. For example, a first value, such as 0, may indicate that conditional handover preparation is earlier than the legacy handover by a first threshold, while a second value, such as 7, may indicate that conditional handover preparation is earlier than the legacy handover by a second threshold, with values in between the first value and second value indicating additional thresholds between the first threshold and second threshold. Such values may provide improved degrees of granularity.

Alternatively and/or additionally, the at least one handover prepare request may comprise one of two values, with the first value, such as 0, indicating strict resource reservation similar to legacy handover, and a second value, such as 1, indicating flexible resource reservation and allowing target NE 130 to reserve fewer resources than actually required, which provides the benefit of overbooking.

In some embodiments, the at least one handover prepare request may comprise at least one extended handover cause value. For example, the handover cause value may comprise at least two additional values, such as "fond-HO-strict" and "Cond-HO-relaxed."

In some embodiments, the at least one handover prepare request may comprise at least one recommended resource reservation indication. For example, a first recommended resource reservation indication, such as 100, may indicate recommending the same resource reservation as for legacy handover, a second recommended resource reservation indication, such as 0, may indicate no resource reservation recommended, and a third resource reservation indication, such as 70, may indicate that 70% of the resource reservation for legacy HO.

In some embodiments, the at least one handover prepare request may comprise at least one indication of a number of target cells, which may include source NE 120, which may be prepared simultaneously. For example, the at least one indication of a number of target cells may indicate that multiple targets could be configured in UE 110, for example, a maximum number of targets, such as 3. In addition, of the indicated number of targets, a single target may be accessed, or none of the indicated number of targets. This allows the advantage that the more targets that are allowed to be configured, the more likely it is that resource reservation is unnecessary, and the fewer resources the target may decide to reserve. In some embodiments, the at least one handover prepare request may comprise at least one indication of a number of target cells, which may include source NE 120, which have been prepared for conditional handover already.

In some embodiments, the at least one handover prepare request may comprise at least one indication of configuration of the measurement event which has triggered the conditional handover preparation. For example, an offset value of an A3 condition triggering the conditional handover preparation may give an indication to target NE 130 and/or timing of the trigger. Alternatively, or in addition, source NE 120 may include a reference to that measurement configuration, which has triggered the conditional handover. In some embodiments, the at least one handover prepare request may comprise at least one indication.

In step 109, target NE 130 may transmit at least one handover request acknowledgement to source NE 120. In step 111, target NE 130 may generate at least one resource reservation. In step 113, source NE 120 may transmit at least one handover prepared cell list command to UE 110, and in step 115, UE 110 may transmit at least one handover command acknowledgement to source NE 120.

In step 117, at least one conditional handover execution condition may be triggered in the UE 110. In step 119, UE 110 may synchronize with target NE 130 and transmit at least one random access indication to target NE 130. In step 121, UE 110 may transmit at least one handover complete indication to target NE 130. In step 123, target NE 130 may transmit at least one handover complete acknowledgement to source NE 120. In step 125, one or more previous preparation indications associated with UE 110 and/or source NE 120 may be rendered invalid.

Figure 2:
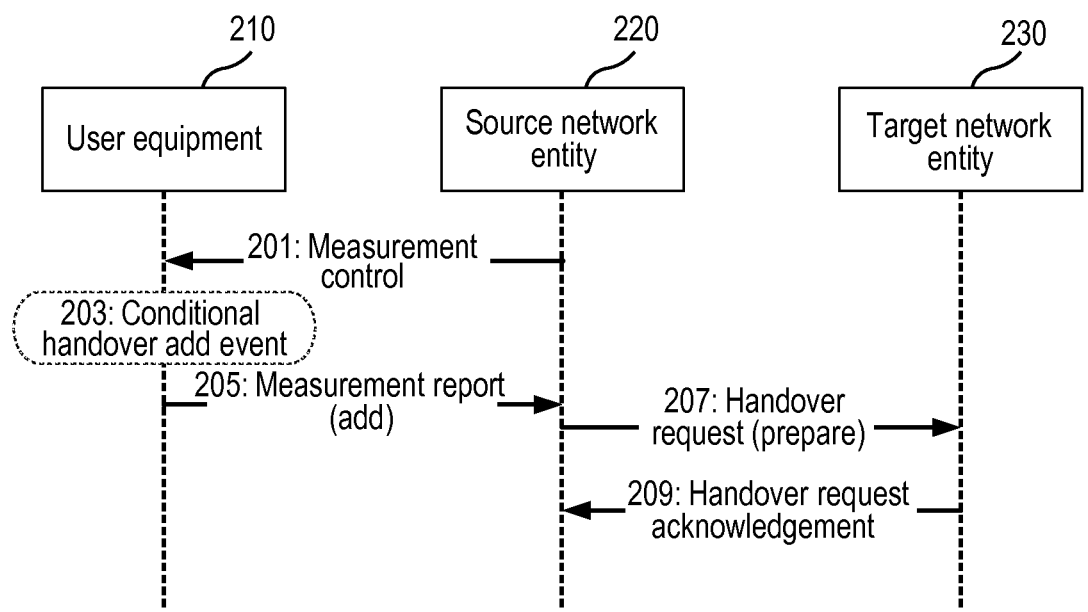
FIG. 2 illustrates another signaling diagram according to certain embodiments.

FIG. 2 illustrates an example of a signalling diagram according to some embodiments. In particular, FIG. 2 illustrates a conditional handover preparation. UE 210 may be similar to user equipment 610 in FIG. 6. In addition, source NE 220 and/or target NE 230 may be similar to NE 620 in FIG. 6. Although only a single UE, source NE, and target NE are illustrated, a communications network may contain one or more of each of these entities.

In step 201, source NE 220 may transmit at least one measurement control indication to UE 110. In step 203, UE 210 may generate at least one conditional handover add event. In step 205, UE 210 may transmit at least one measurement add report to source NE 220. In step 207, source NE 220 may transmit at least one handover prepare request to target NE 230. In various embodiments, the at least one handover prepare request may comprise at least one indication of configuration of at least one execution condition which triggers the execution of the prepared conditional handover towards the target network entity.

In step 209, target NE 230 may transmit at least one handover preparation failure indication to source NE 220. In some embodiments, the at least one handover preparation failure indication may indicate to source NE 220 to discontinue initiating conditional handover for target NE 230 and/or fallback to legacy handover.

In some embodiments, if target NE 230 currently cannot afford the uncertainty of conditional handover resource reservation, the at least one handover preparation failure indication may include at least one indication that future handovers shall fall back to the legacy procedure and/or that no more conditional handovers shall be initiated, which may reduce signalling overhead.

Figure 3:
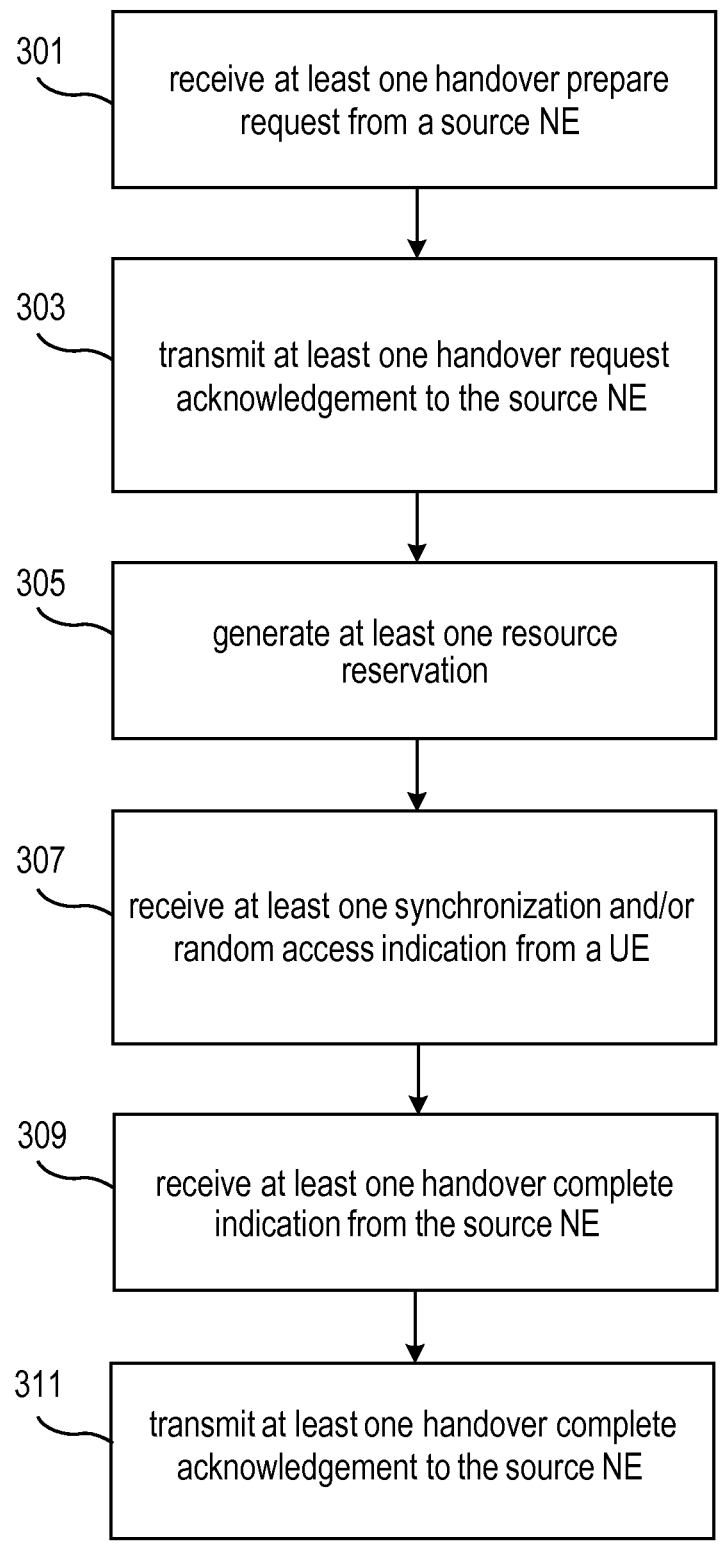
FIG. 3 illustrates an example of a method by a target network entity according to certain embodiments.
Figure 6:
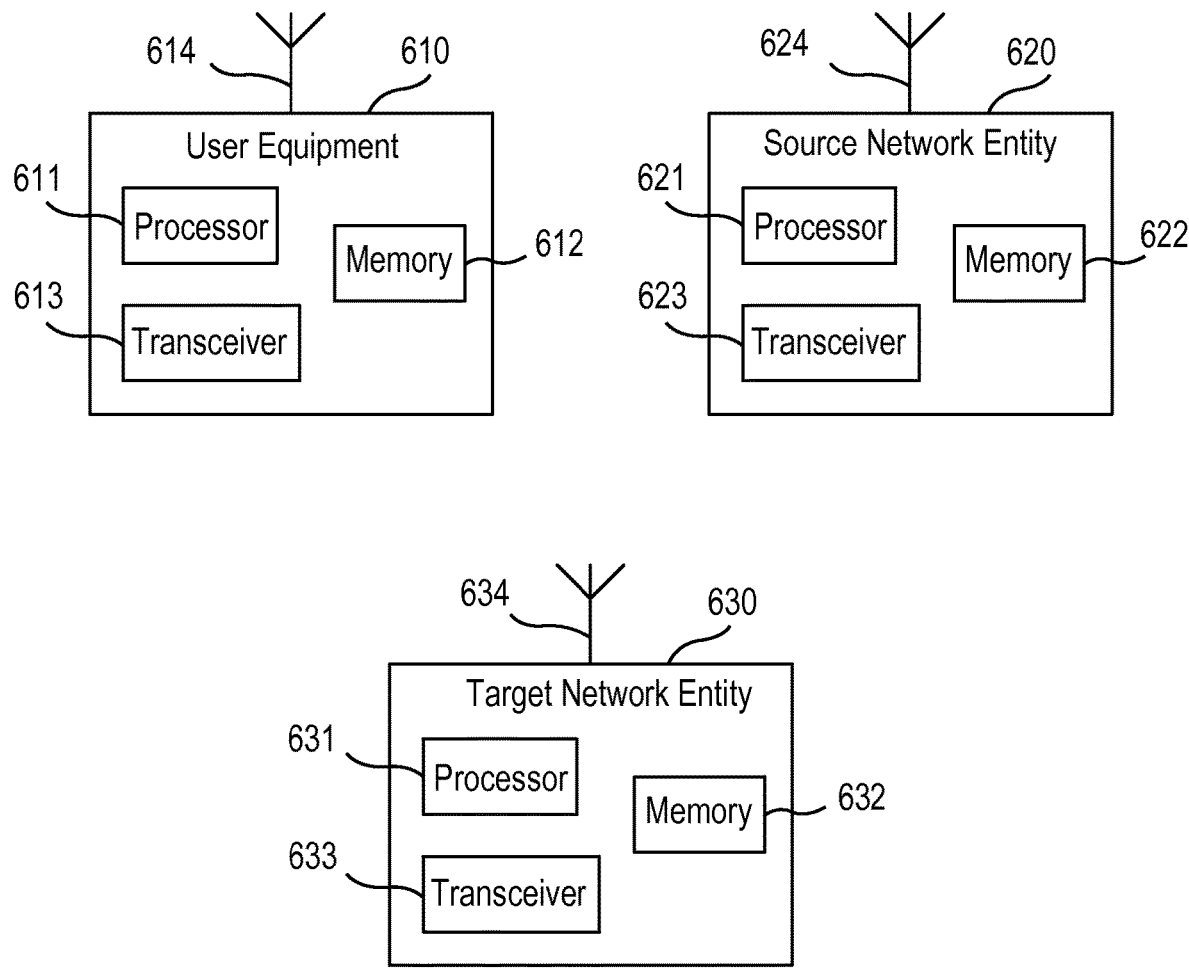
FIG. 6 illustrates an example of a system according to certain embodiments.

FIG. 3 illustrates an example of a method performed by a target NE, for example, target network entity 630 in FIG. 6. In step 301, the target NE may receive at least one handover prepare request from a source NE, such as source NE 620 in FIG. 6. In certain embodiments, the at least one handover prepare request may comprise at least one indication of conditional handover configuration, such as that the indication of early triggering of conditional handover and/or for multiple targets. For example, the at least one indication of conditional handover configuration may include at least one indication that at least one resource reservation may be unnecessary and/or early, allowing the target NE to reserve fewer resources than necessary. In various embodiments, the at least one handover prepare request may comprise at least one indication of configuration of at least one execution condition which triggers the execution of the prepared conditional handover towards the target network entity.

In some embodiments, the at least one handover prepare request may comprise at least one value. For example, a first value, such as 0, may indicate that conditional handover preparation is earlier than the legacy handover by a first threshold, while a second value, such as 7, may indicate that conditional handover preparation is earlier than the legacy handover by a second threshold, with values in between the first value and second value indicating additional thresholds between the first threshold and second threshold. Such values may provide improved degrees of granularity.

Alternatively and/or additionally, the at least one handover prepare request may comprise one of two values, with the first value, such as 0, indicating strict resource reservation similar to legacy handover, and a second value, such as 1, indicating flexible resource reservation, allowing the target NE to reserve fewer resources than actually required, which provided the benefit of overbooking.

In some embodiments, the at least one handover prepare request may comprise at least one extended handover cause value. For example, the handover cause value may comprise at least two additional values, such as "fond-HO-strict" and "Cond-HO-relaxed."

In some embodiments, the at least one handover prepare request may comprise at least one recommended resource reservation indication. For example, a first recommended resource reservation indication, such as 100, may indicate recommend the same resource reservation as for legacy handover, a second recommended resource reservation indication, such as 0, may indicate no resource reservation recommended, and a third resource reservation indication, such as 70, may indicate that 70% of the resource reservation for legacy HO.

In some embodiments, the at least one handover prepare request may comprise at least one indication of a number of target cells, which may include the source NE, which may be prepared simultaneously. For example, the at least one indication of a number of target cells may indicate that multiple targets are to be configured in the UE. This allows the advantage that the more targets that are allowed to be configured, the more likely it is that resource reservation is unnecessary, and the fewer resources the target may decide to reserve.

In some embodiments, the at least one handover prepare request may comprise at least one indication of a number of target cells, which may include the source NE, which have been prepared for conditional handover. In addition, the at least one handover prepare request may comprise at least one indication of whether and how many targets have already been prepared.

In some embodiments, the at least one handover prepare request may comprise at least one indication of configuration of the measurement event which has triggered the conditional handover preparation. For example, an offset value of an A3 condition triggering the conditional handover preparation may give an indication to the target NE and/or timing of the trigger.

In step 303, the target NE may transmit at least one handover request acknowledgement to the source NE. In step 305, the target NE may generate at least one resource reservation. In step 307, the target NE may receive at least one synchronization and/or random access indication from a UE, such as UE 610 in FIG. 6. In step 309, the target NE may receive at least one handover complete indication from the source NE. In step 311, the target NE may transmit at least one handover complete acknowledgement to the source NE.

In some embodiments, the target NE may transmit at least one handover preparation failure indication to the source NE. In some embodiments, the at least one handover preparation failure indication may indicate to the source NE to discontinue initiating conditional handover for the target NE and/or fallback to legacy handover.

In some embodiments, if the target NE currently cannot afford the uncertainty of conditional handover resource reservation, the at least one handover preparation failure indication may include at least one indication that future handovers shall fall back to the legacy procedure and/or that no more conditional handovers shall be initiated, which may reduce signalling overhead.

In some embodiments, the target NE may generate at least one conditional handover cancel command, and/or may transmit the at least one conditional handover cancel command to the target NE. The target NE may then receive at least one conditional handover cancel acknowledgement from the source NE. The target NE may then release at least one resource reservation.

Figure 4:
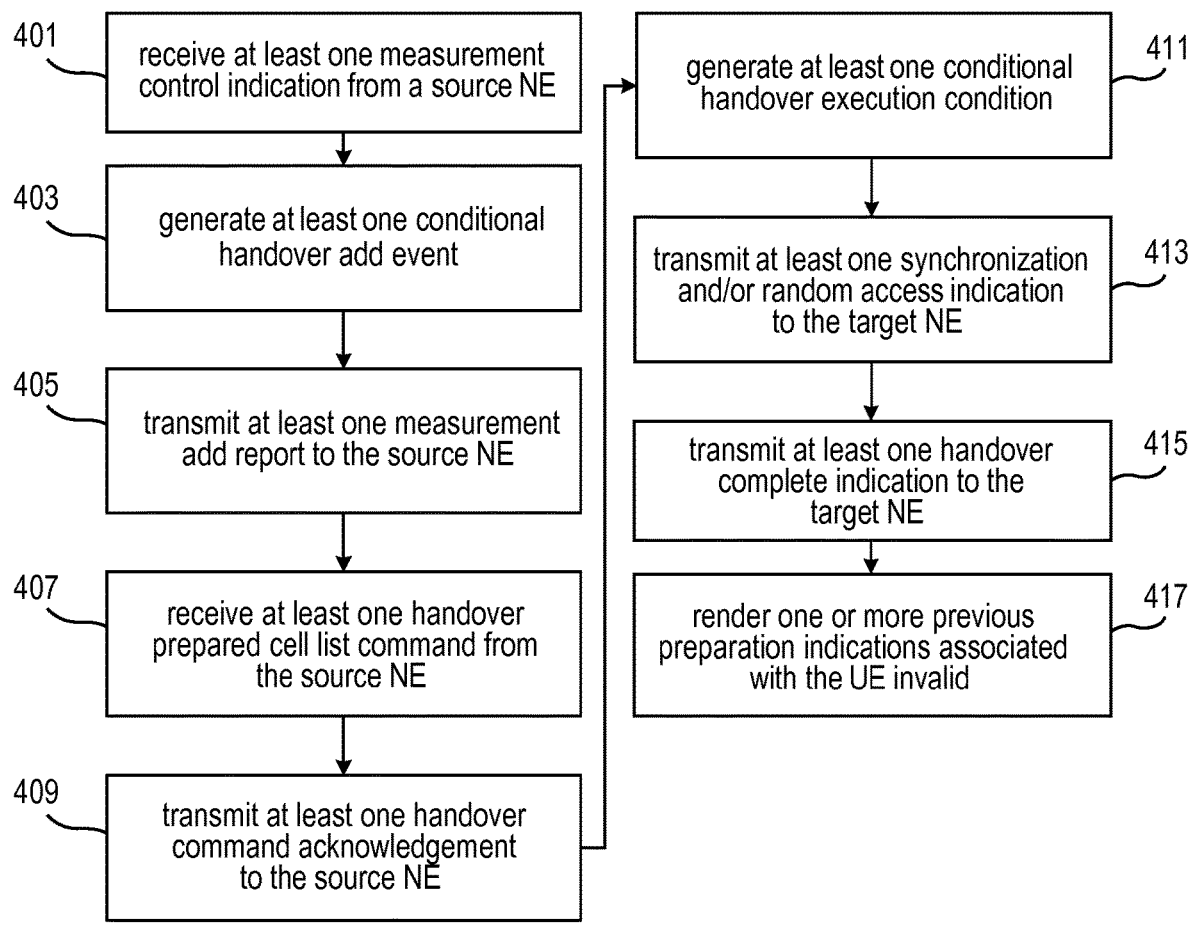
FIG. 4 illustrates an example of a method performed by a user equipment according to certain embodiments.

FIG. 4 illustrates an example of a method performed by a user equipment, for example, user equipment 610 in FIG. 6. In step 401, the UE may receive at least one measurement control indication from a source NE. In step 403, the UE may generate at least one conditional handover add event. In step 405, the UE may transmit at least one measurement add report to the source NE. In step 407, the UE may receive at least one handover prepared cell list command from the source NE. In step 409, the UE may transmit at least one handover command acknowledgement to the source NE. In step 411, the UE may generate at least one conditional handover execution condition. In step 413, the UE may transmit at least one synchronization and/or random access indication to the target NE. In step 415, the UE may transmit at least one handover complete indication to the target NE. In step 417, one or more previous preparation indications associated with the UE may be rendered invalid.

Figure 5:
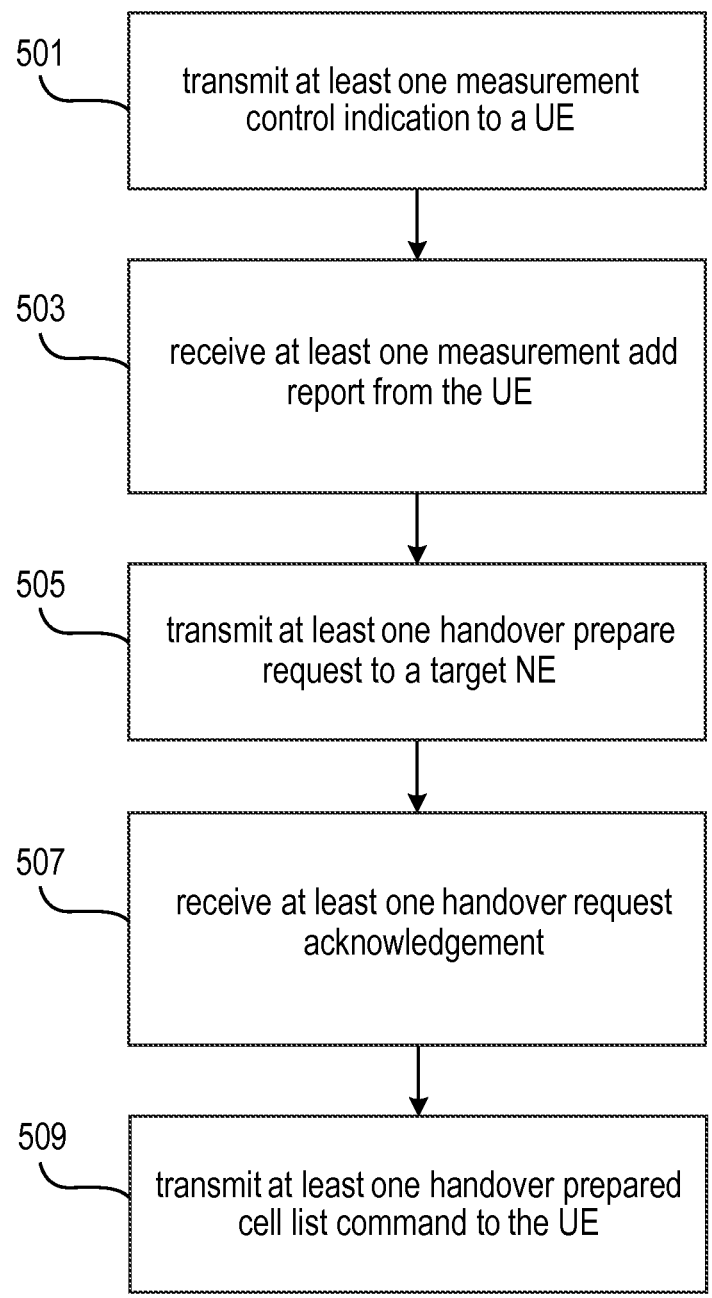
FIG. 5 illustrates an example of a method performed by a source network entity according to certain embodiments.

FIG. 5 illustrates an example of a method performed by a source NE, for example, source network entity 620 in FIG.

6. In step 501, the source NE may transmit at least one measurement control indication to a UE, for example, UE 610 in FIG. 6. In step 503, the source NE may receive at least one measurement add report from the UE.

In step 505, the source NE may transmit at least one handover prepare request to a target NE, for example, target NE 630 in FIG. 6. In certain embodiments, the at least one handover prepare request may comprise at least one indication of conditional handover configuration, such as that the indication of early triggering of conditional handover and/or for multiple targets. For example, the at least one indication of conditional handover configuration may include at least one indication that at least one resource reservation may be unnecessary and/or early, allowing the target NE to reserve fewer resources than necessary.

In some embodiments, the at least one handover prepare request may comprise at least one value. For example, a first value, such as 0, may indicate that conditional handover preparation is earlier than the legacy handover by a first threshold, while a second value, such as 7, may indicate that conditional handover preparation is earlier than the legacy handover by a second threshold, with values in between the first value and second value indicating additional thresholds between the first threshold and second threshold. Such values may provide improved degrees of granularity.

Alternatively and/or additionally, the at least one handover prepare request may comprise one of two values, with the first value, such as 0, indicating strict resource reservation similar to legacy handover, and a second value, such as 1, indicating flexible resource reservation, allowing the target NE to reserve fewer resources than actually required, which provided the benefit of overbooking.

In some embodiments, the at least one handover prepare request may comprise at least one extended handover cause value. For example, the handover cause value may comprise at least two additional values, such as "fond-HO-strict" and "Cond-HO-relaxed."

In some embodiments, the at least one handover prepare request may comprise at least one recommended resource reservation indication. For example, a first recommended resource reservation indication, such as 100, may indicate recommend the same resource reservation as for legacy handover, a second recommended resource reservation indication, such as 0, may indicate no resource reservation recommended, and a third resource reservation indication, such as 70, may indicate that 70% of the resource reservation for legacy HO.

In some embodiments, the at least one handover prepare request may comprise at least one indication of a number of target cells, which may include the source NE, which may be prepared simultaneously. For example, the at least one indication of a number of target cells may indicate that multiple targets are to be configured in the UE. This allows the advantage that the more targets that are allowed to be configured, the more likely it is that resource reservation is unnecessary, and the fewer resources the target may decide to reserve.

In some embodiments, the at least one handover prepare request may comprise at least one indication of a number of target cells, which may include the source NE, which have been prepared for conditional handover already. In addition, the at least one handover prepare request may comprise at least one indication of whether and how many targets have already been prepared.

In some embodiments, the at least one handover prepare request may comprise at least one indication of configuration of the measurement event which has triggered the conditional handover preparation. For example, an offset value of an A3 condition triggering the conditional handover preparation may give an indication to the target NE and/or timing of the trigger.

In some embodiments, the at least one indication of conditional handover configuration may comprise an indication that the configuration shares at least one parameter with at least one legacy handover and/or that a single target is allowed.

In step 507, the source NE may receive at least one handover request acknowledgement. Alternatively, the source NE may receive at least one handover preparation failure indication to from the target NE. In some embodiments, the at least one handover preparation failure indication may indicate to the source NE to discontinue initiating conditional handover for the target NE and/or fallback to legacy handover. In various embodiments, the at least one handover prepare request may comprise at least one indication of configuration of at least one execution condition which triggers the execution of the prepared conditional handover towards the target network entity.

In some embodiments, if the target NE currently cannot afford the uncertainty of conditional handover resource reservation, the at least one handover preparation failure indication may include at least one indication that future handovers shall fall back to the legacy procedure and/or that no more conditional handovers shall be initiated, which may reduce signalling overhead.

In step 509, the source NE may transmit at least one handover prepared cell list command to the UE. In step 511, the source NE may receive at least one handover command acknowledgement from the UE. In step 511, the source NE may receive at least one handover complete acknowledgement from the target NE.

FIG. 6 illustrates an example of a system according to certain embodiments. In one embodiment, a system may include multiple devices, such as, for example, user equipment 610, source network entity 620, and target network entity 630.

UE 610 may include one or more of a mobile device, such as a mobile phone, smart phone, personal digital assistant (PDA), tablet, or portable media player, digital camera, pocket video camera, video game console, navigation unit, such as a global positioning system (GPS) device, desktop or laptop computer, single-location device, such as a sensor or smart meter, or any combination thereof.

Source network entity 620 and/or target network entity 630 may be one or more of a base station, such as an evolved node B (eNB) or next generation node B (gNB), a next generation radio access network (NG RAN), a serving gateway, a server, and/or any other access node or combination thereof.

One or more of these devices may include at least one processor, respectively indicated as 611, 621, and 631. At least one memory may be provided in one or more of devices indicated at 612, 622, and 632. The memory may be fixed or removable. The memory may include computer program instructions or computer code contained therein. Processors 611, 621, and 631 and memory 612, 622, and 632 or a subset thereof, may be configured to provide means corresponding to the various blocks of FIGS. 1-5. Although not shown, the devices may also include positioning hardware, such as global positioning system (GPS) or micro electrical mechanical system (MEMS) hardware, which may be used to determine a location of the device. Other sensors are also permitted and may be included to determine location, elevation, orientation, and so forth, such as barometers, compasses, and the like.

As shown in FIG. 6, transceivers 613, 623, and 633 may be provided, and one or more devices may also include at least one antenna, respectively illustrated as 614, 624, and 634. The device may have many antennas, such as an array of antennas configured for multiple input multiple output (MIMO) communications, or multiple antennas for multiple radio access technologies. Other configurations of these devices, for example, may be provided.

Transceivers 613, 623, and 633 may be a transmitter, a receiver, or both a transmitter and a receiver, or a unit or device that may be configured both for transmission and reception.

Processors 611, 621, and 631 may be embodied by any computational or data processing device, such as a central processing unit (CPU), application specific integrated circuit (ASIC), or comparable device. The processors may be implemented as a single controller, or a plurality of controllers or processors.

Memory 612, 622, and 632 may independently be any suitable storage device, such as a non-transitory computer-readable medium. A hard disk drive (HDD), random access memory (RAM), flash memory, or other suitable memory may be used. The memories may be combined on a single integrated circuit as the processor, or may be separate from the one or more processors. Furthermore, the computer program instructions stored in the memory and which may be processed by the processors may be any suitable form of computer program code, for example, a compiled or interpreted computer program written in any suitable programming language. Memory may be removable or non-removable.

The memory and the computer program instructions may be configured, with the processor for the particular device, to cause a hardware apparatus such as user equipment to perform any of the processes described below (see, for example, FIGS. 1-5). Therefore, in certain embodiments, a non-transitory computer-readable medium may be encoded with computer instructions that, when executed in hardware, perform a process such as one of the processes described herein. Alternatively, certain embodiments may be performed entirely in hardware.

In certain embodiments, an apparatus may include circuitry configured to perform any of the processes or functions illustrated in FIGS. 1-5. For example, circuitry may be hardware-only circuit implementations, such as analog and/or digital circuitry. In another example, circuitry may be a combination of hardware circuits and software, such as a combination of analog and/or digital hardware circuit(s) with software or firmware, and/or any portions of hardware processor(s) with software (including digital signal processor(s)), software, and at least one memory that work together to cause an apparatus to perform various processes or functions. In yet another example, circuitry may be hardware circuit(s) and or processor(s), such as a microprocessor(s) or a portion of a microprocessor(s), that include software, such as firmware for operation. Software in circuitry may not be present when it is not needed for the operation of the hardware.

The features, structures, or characteristics of certain embodiments described throughout this specification may be combined in any suitable manner in one or more embodiments. For example, the usage of the phrases "certain embodiments," "some embodiments," "other embodiments," or other similar language, throughout this specification refers to the fact that a particular feature, structure, or characteristic described in connection with the embodiment may be included in at least one embodiment of the present invention. Thus, appearance of the phrases "in certain embodiments," "in some embodiments," "in other embodiments," or other similar language, throughout this specification does not necessarily refer to the same group of embodiments, and the described features, structures, or characteristics may be combined in any suitable manner in one or more embodiments.

One having ordinary skill in the art will readily understand that certain embodiments discussed above may be practiced with steps in a different order, and/or with hardware elements in configurations which are different than those which are disclosed. Therefore, it would be apparent to those of skill in the art that certain modifications, variations, and alternative constructions would be apparent, while remaining within the spirit and scope of the invention. In order to determine the metes and bounds of the invention, therefore, reference should be made to the appended claims.

Partial Glossary

3 GPP 3rd Generation Partnership Project
4G 4th Generation Mobile Network
5G 5th Generation Mobile Network
CHO Conditional Handover
eNB evolved Node B
gNB New Radio Base Station
GPS Global Positioning System
HO Handover
LTE Long-Term Evolution
NG-RAN Next Generation Radio Access Network
NE Network Entity
NR New Radio
PDA Personal Digital Assistant
RACH Random Access Channel
SON Self Organizing Network
UE User Equipment
VoIP Voice over Internet Protocol

We claim:

1. An apparatus comprising at least one processor and at least one memory including a computer program code, the at least one memory and computer program code configured to, with the at least one processor, cause the apparatus at least to:
    transmit, by a source network entity, at least one handover prepare request comprising at least one extension indication to a target network entity;
    receive, by the source network entity, in response to the at least one handover prepare request, at least one handover request response from the target network entity; and
    transmit, by the source network entity, at least one handover command to at least one user equipment based upon the at least one handover request response, wherein the at least one extension indication comprises one or more of:
    at least one value indicating strict resource reservation associated with the legacy handover; and
    at least one value indicating flexible resource reservation.

2. The apparatus according to claim 1, wherein the at least one indication of a number of target cells that the target network entity may prepare simultaneously includes the source network entity.

3. The apparatus according to claim 1, wherein the at least one extension indication comprises at least one indication of configuration of at least one measurement event which has triggered the conditional handover preparation, wherein the at least one indication of configuration of at least one measurement event comprises at least one offset value of at least one A3 condition triggering the conditional handover preparation.

4. The apparatus according to claim 1, wherein the at least one extension indication comprises at least one indication of configuration of at least one execution condition which triggers the execution of the prepared conditional handover towards the target network entity.

5. The apparatus according to claim 1, wherein the at least one handover request response is configured to cause the source network entity to one or more of:
   discontinue initiating conditional handover to the target network entity for the user equipment, and permit legacy handover for other user equipment;
   discontinue initiating conditional handover to the target network entity so long as the bearer configuration does not change for the user equipment, and permit legacy handover for other user equipment;
   discontinue initiating conditional handover to the target network entity for any user equipment in an associated cell; and
   discontinue initiating conditional handover to the target network entity for a pre-determined period of time and resume conditional handover to the target network entity after the pre-determined period of time expires.

6. The apparatus according to claim 1, wherein the at least one handover request response comprises at least one HO PREPARATION FAILURE message.

7. An apparatus comprising at least one processor and at least one memory including a computer program code, the at least one memory and computer program code configured to, with the at least one processor, cause the apparatus at least to:
   transmit, by a source network entity, at least one handover prepare request comprising at least one extension indication to a target network entity;
   receive, by the source network entity, in response to the at least one handover prepare request, at least one handover request response from the target network entity; and
   transmit, by the source network entity, at least one handover command to at least one user equipment based upon the at least one handover request response, wherein the at least one extension indication is configured to allow the target network entity to reserve fewer resources than required.

8. An apparatus comprising at least one processor and at least one memory including a computer program code, the at least one memory and computer program code configured to, with the at least one processor, cause the apparatus at least to:
   transmit, by a source network entity, at least one handover prepare request comprising at least one extension indication to a target network entity;
   receive, by the source network entity, in response to the at least one handover prepare request, at least one handover request response from the target network entity; and
   transmit, by the source network entity, at least one handover command to at least one user equipment based upon the at least one handover request response, wherein the at least one extension indication comprises at least one recommended resource reservation indication, wherein the at least one recommended resource reservation indication comprises one or more of:
   a first recommended resource reservation indication configured to recommend the same resource reservation as legacy handover;
   a second recommended resource reservation indication configured to recommend no resource reservation; and
   a third resource reservation indication configured to recommend at least one pre-determined percentage of the resource reservation of legacy handover.

9. An apparatus comprising at least one processor and at least one memory including a computer program code, the at least one memory and computer program code configured to, with the at least one processor, cause the apparatus at least to:
   receive, by a target network entity, at least one handover prepare request comprising at least one extension indication from a source network entity;
   transmit, by the target network entity, at least one handover request response based upon the at least one handover prepare request to the source network entity; and
   generate, by the target network entity, at least one resource reservation, wherein the at least one extension indication comprises one or more of:
   at least one value indicating strict resource reservation associated with the legacy handover; and
   at least one value indicating flexible resource reservation.

10. An apparatus comprising at least one processor and at least one memory including a computer program code, the at least one memory and computer program code configured to, with the at least one processor, cause the apparatus at least to:
   receive, by a target network entity, at least one handover prepare request comprising at least one extension indication from a source network entity;
   transmit, by the target network entity, at least one handover request response based upon the at least one handover prepare request to the source network entity; and
   generate, by the target network entity, at least one resource reservation, wherein the at least one extension indication comprises at least one recommended resource reservation indication, wherein the at least one recommended resource reservation indication comprises one or more of:
   a first recommended resource reservation indication configured to recommend the same resource reservation as legacy handover;
   a second recommended resource reservation indication configured to recommend no resource reservation; and
   a third resource reservation indication configured to recommend at least one pre-determined percentage of the resource reservation of legacy handover.

* * * * *